US006286962B1

(12) United States Patent
Hennes et al.

(10) Patent No.: US 6,286,962 B1
(45) Date of Patent: Sep. 11, 2001

(54) BEAMSPLITTER OPTICAL PROJECTION SYSTEM

(75) Inventors: Thomas Hennes; Jennifer Whitburn, both of New York, NY (US)

(73) Assignee: Thomas Hennes, Inc.

( * ) Notice: Subject to any disclaimer, the term of this patent is extended or adjusted under 35 U.S.C. 154(b) by 0 days.

(21) Appl. No.: 09/470,254

(22) Filed: Dec. 22, 1999

Related U.S. Application Data

(60) Provisional application No. 60/113,565, filed on Dec. 23, 1998.

(51) Int. Cl.[7] .................................................. G03B 21/14
(52) U.S. Cl. ................................................ 353/94; 353/79
(58) Field of Search ..................................... 353/8, 30, 79, 353/94, 98, 99; 359/449, 451, 458, 471, 476, 479; 352/69, 70

(56) References Cited

U.S. PATENT DOCUMENTS

| | | | |
|---|---|---|---|
| 1,515,427 | 11/1924 | Bouin . | |
| 3,430,375 | 3/1969 | Altman | 40/158 |
| 3,620,592 | 11/1971 | Freeman | 350/9 |
| 3,784,742 | 1/1974 | Burnham et al. | 178/7.88 |
| 3,792,914 | * 2/1974 | Elias | 353/7 |
| 3,972,021 | 7/1976 | Leitz et al. | 340/38 |
| 4,025,198 | 5/1977 | Hutchins | 356/163 |
| 4,241,980 | 12/1980 | Mihalakis | 350/129 |
| 4,261,647 | 4/1981 | Ellis | 350/174 |
| 4,348,187 | 9/1982 | Dotsko | 434/44 |
| 4,354,738 | 10/1982 | Forehand et al. | 350/126 |
| 4,383,740 | 5/1983 | Bordovsky | 350/504 |
| 4,552,441 | 11/1985 | Dewey | 353/31 |
| 4,731,527 | 3/1988 | Nomura et al. | 250/201 |
| 4,859,030 | 8/1989 | Rotier | 350/174 |
| 4,960,320 | 10/1990 | Taniura | 350/171 |
| 5,004,335 | 4/1991 | Montes | 352/58 |
| 5,112,121 | 5/1992 | Chang et al. | 359/15 |
| 5,189,452 | 2/1993 | Hodson et al. | 353/94 |
| 5,255,028 | 10/1993 | Biles | 353/7 |
| 5,264,881 | 11/1993 | Brooke | 353/94 |
| 5,382,988 | 1/1995 | Nanjo | 351/206 |
| 5,457,508 | * 10/1995 | Ichihara et al. | 353/10 |
| 5,469,295 | 11/1995 | Burke | 359/478 |
| 5,477,385 | 12/1995 | Freeman | 359/629 |
| 5,528,425 | 6/1996 | Beaver | 359/629 |
| 5,543,964 | 8/1996 | Taylor et al. | 359/463 |
| 6,042,238 | * 3/2000 | Blackham et al. | 353/94 |

* cited by examiner

*Primary Examiner*—William Dowling
(74) *Attorney, Agent, or Firm*—Coudert Brothers

(57) ABSTRACT

An optical projection system is disclosed. The optical projection system comprises a projection screen and a plurality of viewing stations. Each viewing station includes a beamsplitter, a projector including a lens, wherein the projector is directed at the beamsplitter, and a mechanical apparatus. The mechanical apparatus is adapted to optimize a quality of an image on the projection screen as seen by an observer looking at the beamsplitter. Projectors at different viewing stations are capable of projecting different images onto the projection screen.

19 Claims, 7 Drawing Sheets

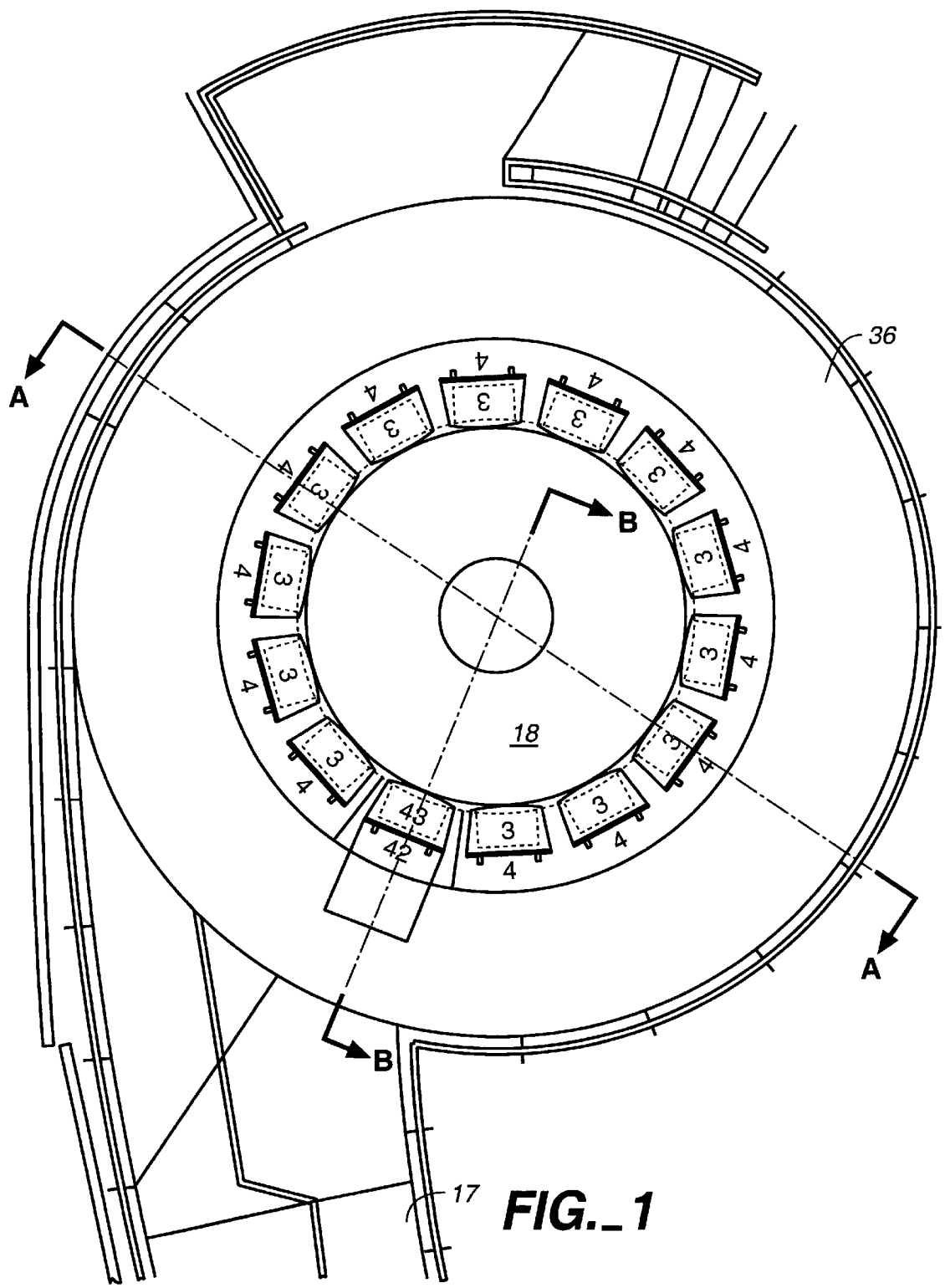
FIG._1

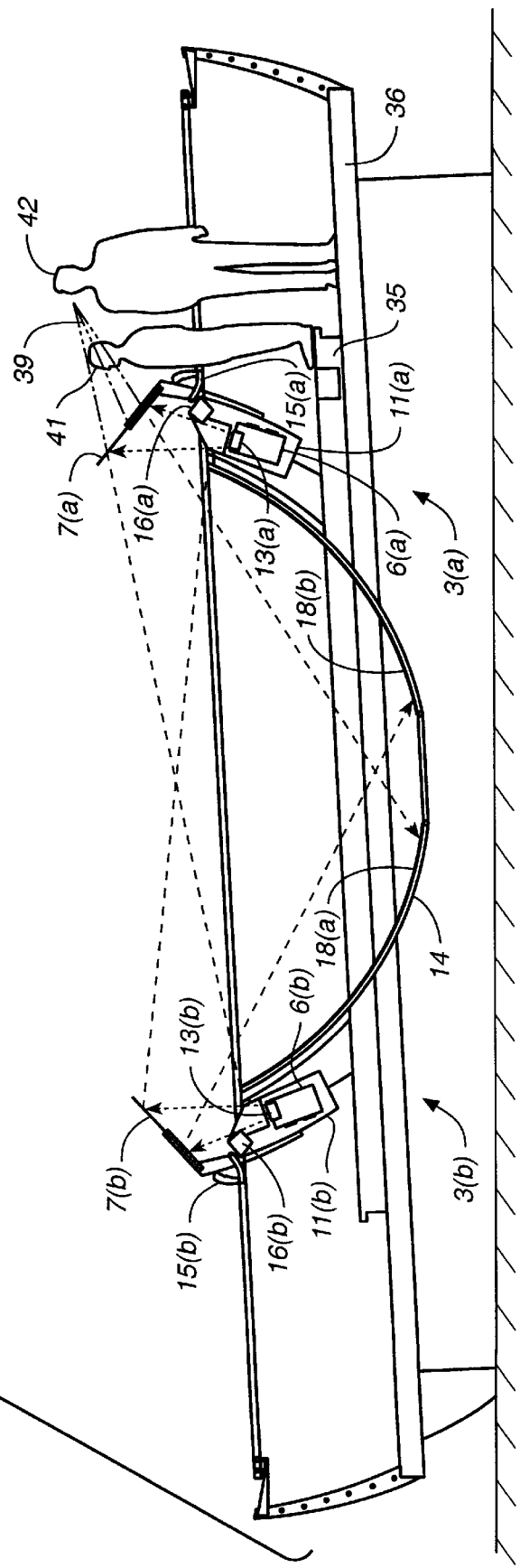
FIG._2

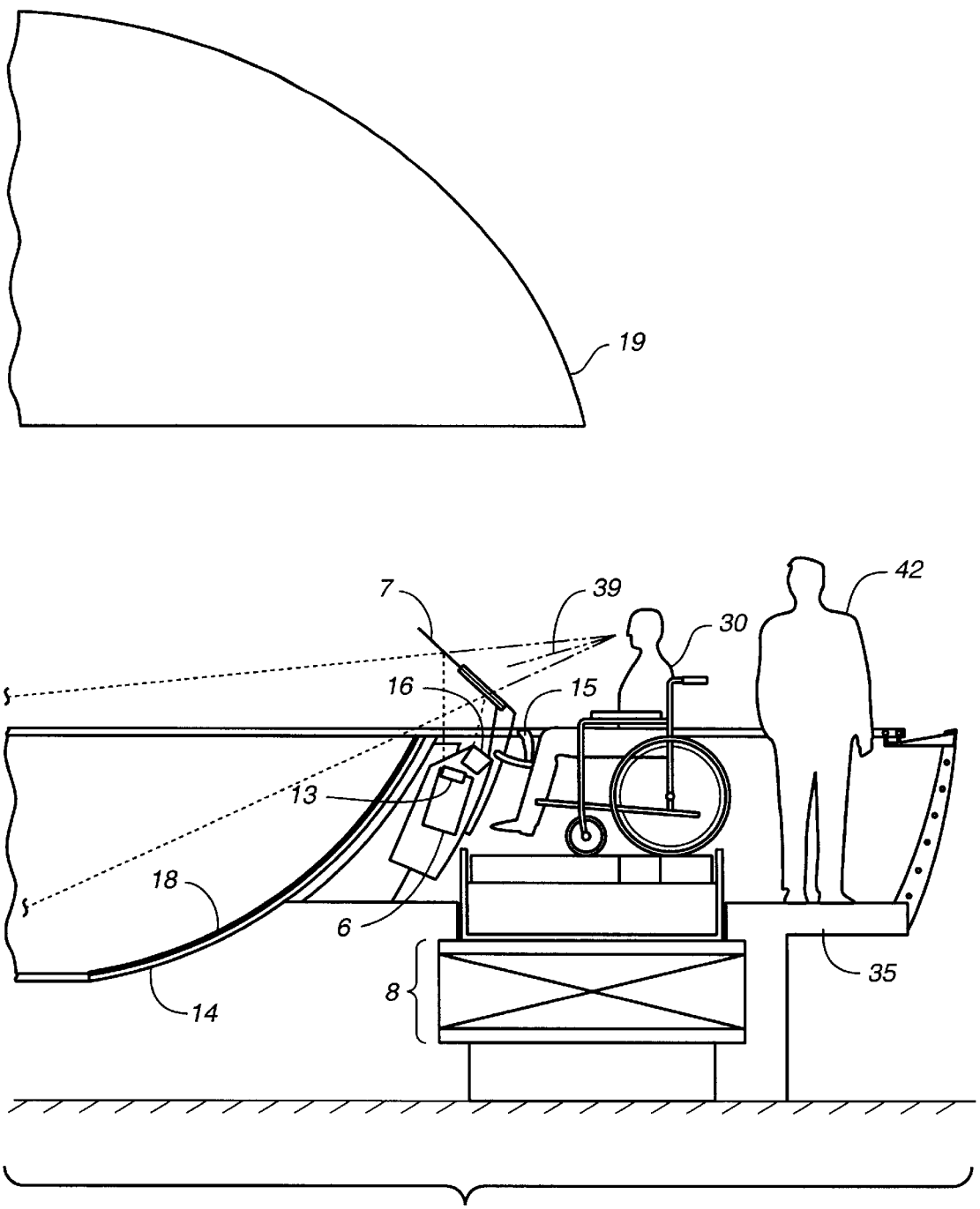
FIG._3

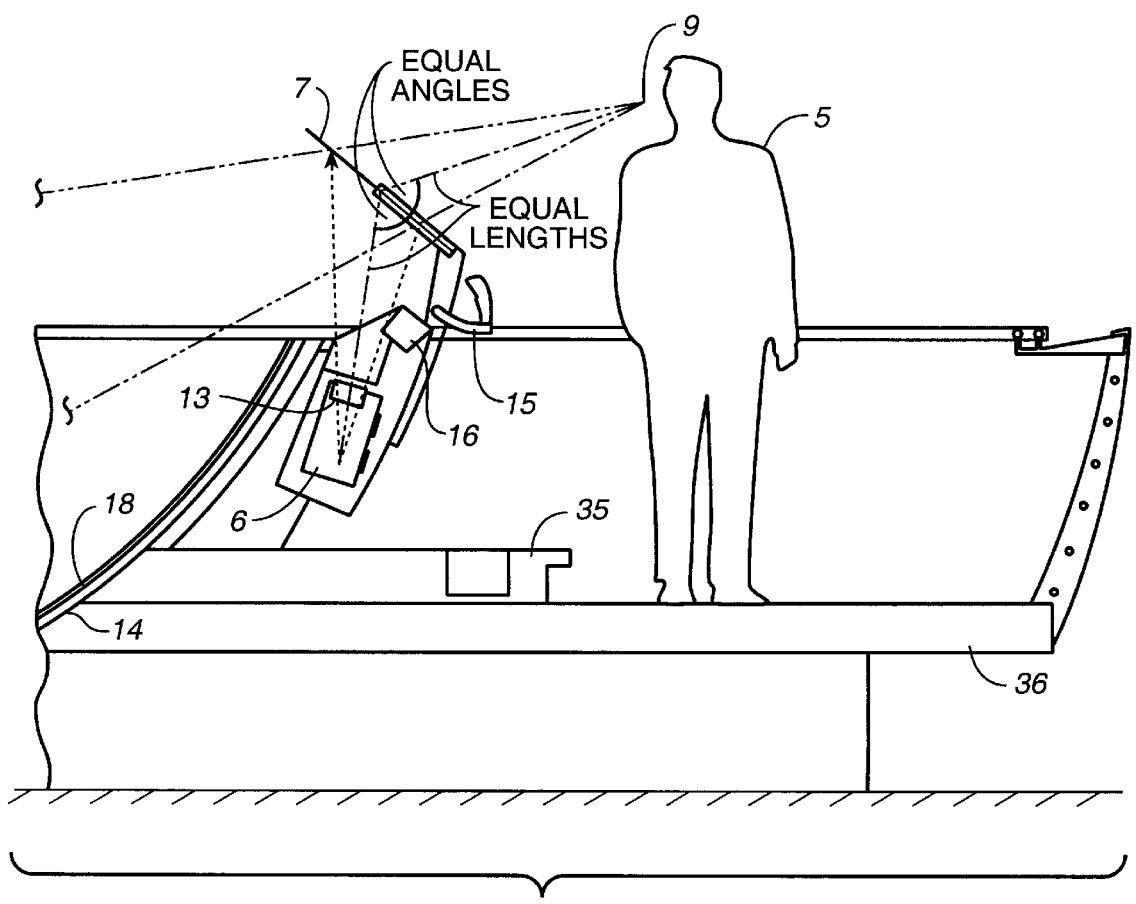
FIG._4

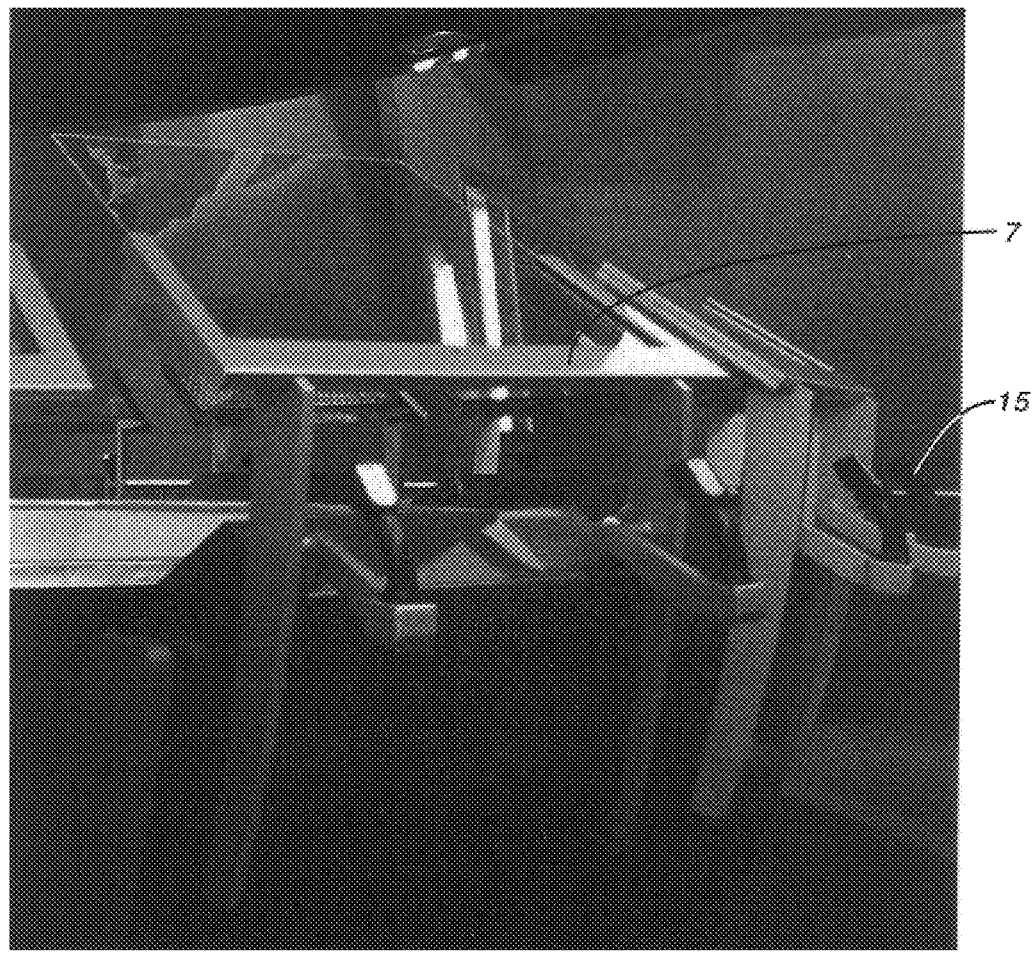
FIG._5

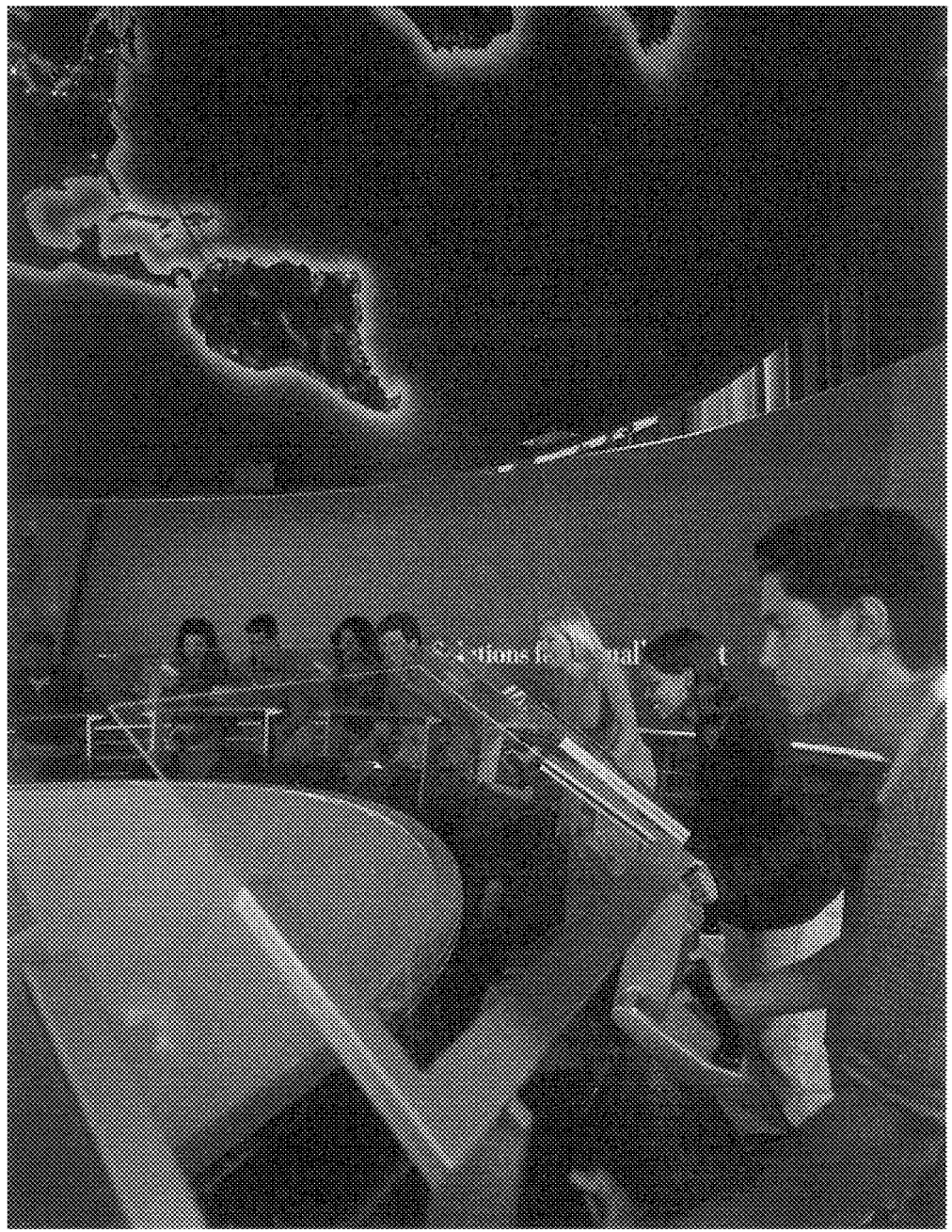
FIG._6

FIG._7

BEAMSPLITTER OPTICAL PROJECTION SYSTEM

RELATED APPLICATIONS

This application claims the benefit of U.S. Provisional Application No. 60/113,565, filed Dec. 23, 1998, which is herein incorporated by reference in its entirety for all purposes.

FIELD OF THE INVENTION

Embodiments of the invention relate to an optical projection system using beamsplitters.

BACKGROUND OF THE INVENTION

Some optical projection systems can display multiple images for several observers to view simultaneously. For example, in some flight and combat simulators, distortionless images are displayed to observers to provide them with simulated practice environments. Different observers are seated close together at fixed locations and simultaneously view respectively different images. To prevent the different projected images from interfering with each other, separate viewing volumes can be provided for each observer. However, building separate viewing volumes for each observer can be an expensive undertaking.

Other optical projection systems have used beamsplitters to provide multiple images to multiple observers. In these systems, a lens-projector and beamsplitter combination is used, and images are simultaneously displayed on a non-spherical screen to spatially separated observers. Each observer is placed in a fixed position such that his or her eyes are placed at substantially the same reflected position as the projector lens to view a distortionless, bright, optically brilliant image. Moreover, each observer is able to view a discrete image, which is not viewable by other observers, on the projection screen. In essence, the image viewed by any one individual observer at the optimum position appears sufficiently bright in contrast to the image viewed by other observers to "wash out" the other image, thus rendering it unable to cause interference with the image being specifically viewed by the individual observer. To view a distortionless, optically brilliant image, each observer must be at a specified or exact position to view the desired discrete visual information.

The system just described, while effective in some instances, could be improved. For example, when the position of the system components are fixed, the location of the observer's eyes must be positioned at a particular location to observe an image of optimal quality. Since observers have different heights, an observer may have to adjust his or her body to place his or her eyes at the optically correct position. This can result in an inconvenient viewing experience for the observers.

Embodiments of the invention address these and other problems.

SUMMARY OF THE INVENTION

Embodiments of the invention advantageously permit multiple observers to respectively view different images displayed on a common projection screen. Observers of differing heights view clear and bright images without optical interference from other images being displayed at the same time. Moreover, the beamsplitter optical projection system embodiments can be easily installed at any desired location.

One embodiment of the invention is directed to an optical projection system. The optical projection system comprises a projection screen and a plurality of viewing stations. Each viewing station includes a beamsplitter, a projector including a lens, wherein the projector is directed at the beamsplitter, and a mechanical apparatus. The mechanical apparatus is adapted to optimize a quality (e.g., resolution and/or brightness) of an image on the projection screen as seen by an observer looking at the beamsplitter. Projectors at different viewing stations are positioned to project different images onto the projection screen simultaneously.

These and other embodiments will be described in more detail below.

BRIEF DESCRIPTION OF THE DRAWINGS

FIG. 1 is top plan view of showing a beamsplitter optical projection system embodiment in a viewing structure.

FIG. 2 is a cross sectional view of the beamsplitter optical projection system corresponding to line A—A in FIG. 1.

FIG. 3 is cross-sectional view of the beamsplitter optical projection system corresponding to line B—B shown in FIG. 1.

FIG. 4 is a cross-sectional view of a viewing station.

FIG. 5 is a perspective view showing the dual handgrips and a beamsplitter at a viewing station.

FIGS. 6 and 7 are perspective views showing a plurality of observers using the optical projection system embodiment.

DETAILED DESCRIPTION

In embodiments of the invention, a plurality of observers of various heights and handicaps can simultaneously view respectively different, geometrically corrected images in a common space without interference from other images. The images (e.g., still photos, video images, etc.) are displayed on a common projection screen and are very bright and clear to the observers viewing them. Image discrepancies (e.g., distortion) caused by factors such as the shape of the screen, the angle formed by the optical axis of projection, and/or the angle formed by the viewing axis can be easily corrected. The optical geometry between a beamsplitter, a projector lens, and the observer's eyes can be adjusted using a mechanical apparatus so that a bright and clear image is viewable by the observer. For example, by providing a means for observers to adjust their viewing position such that their eyes are substantially at the same reflected position as the projection lens. Any apparent "keystoning", that is, distortion of the image due to the shape of the projection surface relative to the projection plane or projection optical axis is eliminated.

In the system, one or more separated or overlapping images are projected onto a common projection screen in such a way that individual observers or small groups of observers positioned at individual, spatially separated, interactive viewing stations are able to view projected images specifically intended for their stations without optical interference from other images being projected. An observer can thus have an individualized viewing experience, while being in a common space with others having their own individualized viewing experiences.

In a typical example, the image viewed by an observer originates from a projector located at the observer's viewing station. The projector directs an image to a beamsplitter at the station and the beamsplitter reflects a portion of the image toward the projection screen. After receiving the image, the projection screen reflects the received image back to the beamsplitter. The observer can be seated, standing, or moving while viewing the image on the projection screen by looking through the beamsplitter.

Each of the viewing stations may also have a mechanical apparatus and an audio system which can be controlled by the observer. In this regard, observers may interact with his or her viewing station so that his or her viewing and listening experience is customized. As will be explained in more detail below, the mechanical apparatus can be used to optimize the optical geometry between the beamsplitter, projector lens, and the observer's eyes, e.g., by moving an observer (e.g., horizontally or vertically) at the viewing station to an optimum viewing position. The audio system provides audio information and/or music for the observer to hear while the observer views images at the viewing station. For example, a soundtrack can be played while the observer views preselected images, thus providing the observer with a multimedia experience.

Further preferred details relating to embodiments of the invention are described with reference to the Figures.

FIG. 1 shows a plurality of viewing stations 3, 43 (e.g., fourteen viewing stations) disposed in a viewing structure 36 such as an inclined open platform. The structure can be located in an exhibition hall or an amusement structure in a theme park or other venue. A ramp 17 can be used by observers to exit or enter the structure 36. An upper hemisphere structure (see exemplary structure 19 in FIG. 2) may be disposed over the viewing stations 3, 43 to block out extraneous light, thus providing favorable viewing conditions. Each viewing station 3, 43 also includes a position 4, 42 for observers to stand or sit. One or more viewing stations 43 may be adapted to accommodate handicapped or disabled observers. As shown in FIG. 1, the viewing stations 3, 43 are arranged around (e.g., 360 degrees) a hemisphere shaped projection screen 18, which preferably has an outer diameter of about fourteen feet or more. When the viewing stations are arranged in a circle as shown in FIG. 1, the angle formed by the optical axes of two observers at respective adjacent viewing stations is preferably fifteen degrees or more. Reflected images from a plurality of beamsplitters located at each of the viewing stations 3, 43, are received by the projection screen 18, and the projection screen 18 reflects the images back towards the beamsplitters. Observers at the viewing stations 3, 43 view images on the projection screen 18 by looking at the beamsplitters. After viewing an image at a particular viewing station, an observer can move to another viewing station to view a different image. For example, the observers can move around the perimeter of the projection screen 18 and they can witness one image fade into the next as they look at beamsplitters at successive viewing stations.

Advantageously, the image being viewed by an observer at one viewing station is not substantially affected by the images being viewed by observers at other viewing locations, because the observers at different stations are not positioned along the same optical axis. When the observers are positioned along different optical axes, they see different images.

Details of exemplary viewing stations can be described with reference to FIG. 2. The viewing stations 3(*a*), 3(*b*) include projectors 6(*a*), 6(*b*). Each of the projectors 6(*a*), 6(*b*) can include a lens 13(*a*), 13(*b*). Any suitable projector can be used including a video projector or slide projector. For example, the projector may be an LCD or light-valve color projector with a single exit pupil. If desired, the projectors 6(*a*), 6(*b*) can be disposed in a projector housing 11(*a*), 11(*b*). The housings 11(*a*), 11(*b*) are located outside of, and below an outer rim of, a lower hemisphere structure 14 which supports a projection screen. Handgrips 15(*a*), 15(*b*) for optimizing viewing geometries and for controlling any audio output can be coupled to the housings 11(*a*), 11(*b*).

Each viewing station includes a beamsplitter. Beamsplitters 7(*a*), 7(*b*) are positioned at a predetermined angle and may be coupled to the housings 11(*a*), 11(*b*) using fixed bracket sets. As shown in FIG. 2, the beamsplitters 7(*a*), 7(*b*) are located above the projectors 6(*a*), 6(*b*), and receive images from the projectors 6(*a*), 6(*b*). The images received by the beamsplitters 7(*a*), 7(*b*) are partially reflected to portions 18(*a*), 18(*b*) of the projection screen (which is supported by a lower hemisphere structure 14) opposite the viewing stations 3(*a*), 3(*b*). For each station, the total distance from the protector lens 13(*a*), 13(*b*), to the beamsplitters 7(*a*), 7(*b*) to the respective portions 18(*a*), 18(*b*) of the projection screen may be 15 feet to 20 feet, preferably 16 to 17 feet.

The beamsplitters used in embodiments of the invention are preferably made of a sheet of glass with a partially reflective layer on one side and an anti-reflective layer on the other. The partially reflective surface may be produced by coating a glass sheet with a silvered material. In some instances, a double reflection can be caused by a second reflection off of the other surface of the glass. Accordingly, it is desirable to coat the other side of the glass sheet with an antireflective material. The use of an anti-reflective coating helps to prevent a double reflection of the image provided by the projector. In preferred embodiments, the front surface of the beamsplitter is mirrored to reflect approximately 50–70% of the incident light, while the rear surface of the beamsplitter does not reflect the incident light. Also, each of the beamsplitters preferably include an anti-shattering material to prevent them from shattering when undue pressure is applied.

The projection screen used in embodiments of the invention may be flat or curved (e.g., hemispherical) and can be formed from sheets of overlapping material. The projection screen may be made of any suitable material including fiberglass, and preferably includes a retroflective material. Suitable retroflective materials can be obtained from 3M Corporation. Retroflective materials are desirable, because they can return light in the direction from which it originates, regardless of the angle of incidence. In preferred embodiments, the projection screen includes self-adhesive sheets of a flexible, retroreflective material applied to the inner surface of a hemispherical support structure. If the sheets are overlapped, overlapping edges are preferably not easily visible to the observer.

With reference to FIG. 2, one or more speakers 16(*a*), 16(*b*) at the viewing stations 3(*a*), 3(*b*) are located proximate to or within the projector housings 11(*a*), 11(*b*). The speakers 16(*a*), 16(*b*) provide sound (e.g., music, narration) for the observers during viewing, and permit discrete listening for each observer at his or her viewing station. As will be described in more detail below, an observer can control the audio output or image quality at his or her viewing station so that the observer's experience is customized.

Observers 41, 42 at their viewing station 3(*a*) view one or more images on the projection screen portion 18(*a*) by looking at the beam splitter 7(*a*). The observers 41, 42 can have substantially the same viewing axis 39. A mechanical apparatus including an elevation structure 35 (e.g., steps, incline) or elevation device may be provided at the viewing station 3(a) to help shorter observers such as children obtain proper positioning in front of the beamsplitter 7(a). Taller observers 42 may stand or sit on a platform 36 appropriate for their height. The image viewed by the observers 41, 42 is of very high quality and is nearly three dimensional.

While the observers 41, 42 at the viewing station 3(a) view an image on a portion 18(a) of the projection screen, observers at another viewing station 3(b) may view a different image on another portion 18(b) of the projection screen. As shown in FIG. 2, the images reflected onto the projection screen from respectively different beamsplitters can be spatially separated from each other on the projection screen, and do not optically interfere with each other. Observers at the viewing stations 3(a), 3(b) have different viewing axes, and are thus able to view respectively different images simultaneously.

Preferably, the optical geometry between the beamsplitter, the observer's eyes, and the projector lens is optimized to produce a clear and bright image for the observer to see. For example, the position of the observer's eyes are at a position which is substantially along the projection axis at the same distance from the projection surface as the optical center of the projection lens. This relationship can be achieved through the use of a beamsplitter which is placed between the observer and the projection surface, and which allows the physical position of the optical center of the projection lens to be in a reflected position which is substantially in the same optical position as the observer's eye. Typically, the position of the observer's eyes and the position of the projector lens are substantially symmetrical with respect to the beamsplitter.

With reference to FIG. 4, the distance between the projector lens 13 and the beamsplitter 7, and the distance between the observer's eyes 9 and the beamsplitter are preferably substantially equal. For instance, the distance between the beamsplitter surface 7 and the lens which produces the image is preferably between 2 to 3 feet (e.g., 2 feet, 3 inches), while the distance between the optical image on the beamsplitter and the eye of the observer can also be 2 to 3 feet (e.g. 2 feet, 3 inches). Also, the angle formed by a light beam from the projector lens 13 and the beamsplitter 7, and the angle formed by the viewing axis and the beamsplitter 7 are preferably substantially equal.

A mechanical apparatus can be used to obtain the optimum optical geometry for viewing images. For example, in some embodiment, the mechanical apparatus may move one or more of the beamsplitter, the observer, and/or the projector lens to arrive at the optimal optical geometry to provide the observer with a distortionless, optically brilliant image to view. Alternatively or additionally, the mechanical apparatus includes steps or an incline so that observers can move to an optimal viewing position. Preferably, the observer can operate the mechanical apparatus using his or her hands. For example, the mechanical apparatus can include a pair of handgrips such as those shown in FIG. 5. The handgrips 15 may be operated by the observer and may be used to move the observer, projector lens (e.g., by moving the projector) and/or the beamsplitter to achieve the optimal viewing geometry for the observer. In some embodiments, the observer can move himself or herself horizontally, vertically, or diagonally to an appropriate viewing position using the handgrips 15. In an illustrative example and with reference to FIG. 3 (where like numerals designate like elements described above), a handicapped observer 30 is present on an elevation device 8. The observer 30 can raise or lower himself or herself via the elevation device 8 by using the handgrips 15 until the optimum viewing position is achieved.

The viewing stations may also include other features for the observers to control. For example, in those embodiments using handgrips, the handgrips (or other device) may be used to control the sound or images seen by the observer. For instance, an observer may stop, rewind, or fast forward a soundtrack and/or images using the handgrips 15. In addition, the handgrips 15 can be used for navigation through a menu (e.g., a viewing or audio menu), and can be used to adjust or select any audio output at the viewing station. The handgrips 15 can also include a trigger or button at the ends (similar to a joystick in a video game) for observer input.

FIGS. 6 and 7 show a plurality of observers viewing different images on a common projection screen at different stations while in a single common space. As is apparent from FIGS. 6 and 7, embodiments of the invention as especially useful as an attraction in, for example, a theme park. However, embodiments can also be used in connection with flight simulators, virtual reality apparatuses, movie screenings or any suitable environment where projected images are viewed.

It is to be understood that this invention is not limited to those precise embodiments and modifications, and that other modifications and variations may be affected by one skilled in the art without departing from the spirit and scope of the invention as defined by the appended claims. Moreover, any one or more features of any embodiment of the invention may be combined with any one or more other features of any other embodiment of the invention, without departing from the scope of the invention.

We claim:

1. An optical projection system comprising:
    a projection screen; and
    a plurality of viewing stations, wherein each viewing station includes
        a beamsplitter,
        a projector including a lens, wherein the projector is directed at the beamsplitter, and
        a mechanical apparatus adapted to optimize a quality of an image on the projection screen as seen by an observer looking at the beamsplitter,
    wherein projectors at different viewing stations are positioned to project different images onto the projection screen.

2. The optical projection system of claim 1 wherein the projection screen comprises a retroflective material.

3. The optical projection system of claim 1 wherein the projection screen is shaped as a hemisphere.

4. The optical projection system of claim 1 wherein the mechanical apparatus comprises steps or an incline.

5. The optical projection system of claim 1 wherein the mechanical apparatus comprises a pair of handgrips.

6. The optical projection system of claim 1 wherein the projection screen is formed from overlapping sheets of a material.

7. The optical projection system of claim 1 wherein the mechanical apparatus is capable of being controlled by the observer.

8. The optical projection system of claim 1 wherein the beamsplitter is located between the projector and the observer.

9. The optical projection system of claim 8 wherein a distance between the observer's eyes and the beamsplitter is approximately equal to a distance between the beamsplitter and the lens.

10. The optical projection system of claim 1, wherein each viewing station further comprises a speaker.

11. The optical projection system of claim 1 wherein the mechanical apparatus include an elevation device upon which the observer is disposed.

12. The optical projection system of claim 1 wherein the projection screen is shaped as a hemisphere, and wherein the viewing stations are disposed around the projection screen.

13. The optical projection system of claim 12 wherein, at each viewing station, the projector projects an image onto the beamsplitter which partially reflects the image onto a portion of the projection screen opposite the beamsplitter.

14. The optical projection system of claim 1 wherein each viewing station further comprises a speaker and a volume control controllable by the observer.

15. The optical projection system of claim 1 wherein the beamsplitter includes an antireflective coating.

16. The optical projection system of claim 1 wherein the beamsplitter comprises a glass sheet coated with an antireflective material on a first side of the glass sheet and a reflective material on the second side of the glass sheet.

17. The optical projection system of claim 1 wherein at least one viewing station of the plurality of viewing stations is adapted to accommodate a handicapped observer.

18. The optical projection system of claim 1 wherein the mechanical apparatus is adapted to move the observer.

19. An optical projection system for providing a display of more than one visual image to a plurality of non-stationary observers in a confined environment, wherein the observers view one image at a time at each of a plurality of viewing stations, comprising:

a projection screen formed from an overlapping of projection screens of a selected material;

a plurality of projector means, each having a lens source that projects different display images onto the projection screen located at each of the viewing stations, that projects the different display images into an optimum viewing position occupiable by the observers at the stations;

a plurality of beamsplitters located between the observers and the projector means at each of the viewing stations; and a plurality of mechanical means to adjust the vertical optical axis along the projection screen and the horizontal axis between the screen and the observer position for achieving the optimum viewing position.

\* \* \* \* \*